United States Patent
Pawar et al.

(10) Patent No.: US 10,187,835 B2
(45) Date of Patent: Jan. 22, 2019

(54) SYSTEMS AND METHODS FOR SELECTING AN ACCESS NODE AND/OR CELL SECTOR FOR HANDOVER OF A WIRELESS DEVICE

(71) Applicant: Sprint Spectrum LP, Overland Park, KS (US)

(72) Inventors: Hemanth Pawar, Brambleton, VA (US); Krishna Sitaram, Chantilly, VA (US); Pratik Kothari, Pune (IN)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/882,227

(22) Filed: Jan. 29, 2018

(65) Prior Publication Data

US 2018/0199252 A1 Jul. 12, 2018

Related U.S. Application Data

(63) Continuation of application No. 15/404,470, filed on Jan. 12, 2017, now Pat. No. 9,942,814.

(51) Int. Cl.
| | |
|---|---|
| *H04W 36/00* | (2009.01) |
| *H04W 36/08* | (2009.01) |
| *H04W 36/22* | (2009.01) |
| *H04W 36/38* | (2009.01) |
| *H04B 7/08* | (2006.01) |
| *H04B 7/0408* | (2017.01) |

(52) U.S. Cl.
CPC .......... *H04W 36/08* (2013.01); *H04B 7/0408* (2013.01); *H04B 7/086* (2013.01); *H04W 36/0083* (2013.01); *H04W 36/0094* (2013.01); *H04W 36/22* (2013.01); *H04W 36/38* (2013.01)

(58) Field of Classification Search
None
See application file for complete search history.

(56) References Cited

U.S. PATENT DOCUMENTS

| | | |
|---|---|---|
| 8,913,593 B2 | 12/2014 | Dinan |
| 2014/0098783 A1 | 4/2014 | Wan et al. |
| 2014/0204902 A1 | 7/2014 | Maltsev et al. |
| 2016/0197659 A1 | 7/2016 | Yu |
| 2016/0337916 A1* | 11/2016 | Deenoo ............ H04W 8/22 |

FOREIGN PATENT DOCUMENTS

| | | |
|---|---|---|
| WO | 20160198123 A1 | 12/2016 |
| WO | 20160198124 A1 | 12/2016 |

OTHER PUBLICATIONS

PCT/US2018/013272 Written Opinion and International Search Report, dated Mar. 27, 2018.

* cited by examiner

*Primary Examiner* — Idowu O Osifade

(57) ABSTRACT

Systems and methods are described for performing handover of a wireless device to a target Access Node (AN) sector. Beam-form capable sectors of one or more target ANs may be selected from a pool of candidate sectors. At least one of the selected sectors may be prioritized (e.g., over the other sectors) based on an open beam-form seat. Handover of the wireless device from a first AN to the prioritized sector may be performed.

20 Claims, 6 Drawing Sheets

SYSTEMS AND METHODS FOR SELECTING AN ACCESS NODE AND/OR CELL SECTOR FOR HANDOVER OF A WIRELESS DEVICE

This patent application is a continuation of U.S. patent application Ser. No. 15/404,470, filed on Jan. 12, 2017, which is incorporated by reference in its entirety for all purposes.

TECHNICAL BACKGROUND

As wireless networks develop, spatial filtering creates opportunities to combat multipath fading and/or to mitigate co-channel interference at wireless devices. For example, in Heterogeneous Networks (HetNet), smart antenna arrays (e.g., switched-beam, phased array, and/or adaptive array systems) may be deployed at Access Nodes (ANs) to direct beams toward select wireless devices (or geographic areas) within a radio range of the ANs to increase signal-capturing power at the wireless devices, while suppressing and/or nullifying signals emanating to/from other wireless devices and/or ANs (i.e., "beamforming"). Smart antenna arrays are also used by wireless networks to improve long-range communications. Because ANs support a restricted number of "beam-formed" wireless devices (e.g., as a function of Sounding Reference Signal (SRS) period(s)), handover of a beam-formed (or candidate) wireless device to target ANs and/or cell sectors having high beam-form loads may result in undesirable loss of throughput and/or Quality of Service (QoS) for the beam-formed (or candidate) wireless device.

Overview

Systems and methods are described for performing handover of a wireless device to a target AN sector. For example, beam-form capable sectors of one or more target ANs may be selected from a pool of candidate sectors. At least one of the selected sectors may be prioritized (e.g., over the other sectors) based on an open beam-form seat. Handover of the wireless device from a first AN to the prioritized sector may be performed.

In another embodiment, it may be verified that a first sector offers beamforming. A list of prioritized neighboring sectors may be generated based on the verification; the neighboring sectors may be selected (e.g., for prioritization) based on an open beamforming seat. A beam-form load may be calculated for each of the prioritized neighboring sectors. The neighboring sector having a beam-form load meeting a set criteria may be selected for handover of the wireless device.

In yet another embodiment, candidate sectors may be selected from a pool of neighboring AN sectors; the candidate sectors are prioritized based on an open beam-form seat. An amount of beam-formed wireless devices may be calculated for each of the prioritized candidate sectors. The prioritized candidate sector with a least amount of beam-formed wireless devices may be selected for handover of the wireless device. Handover of the wireless device from a first sector of a first AN to the selected candidate sector may be performed.

DETAILED DESCRIPTION

Figure 1A:
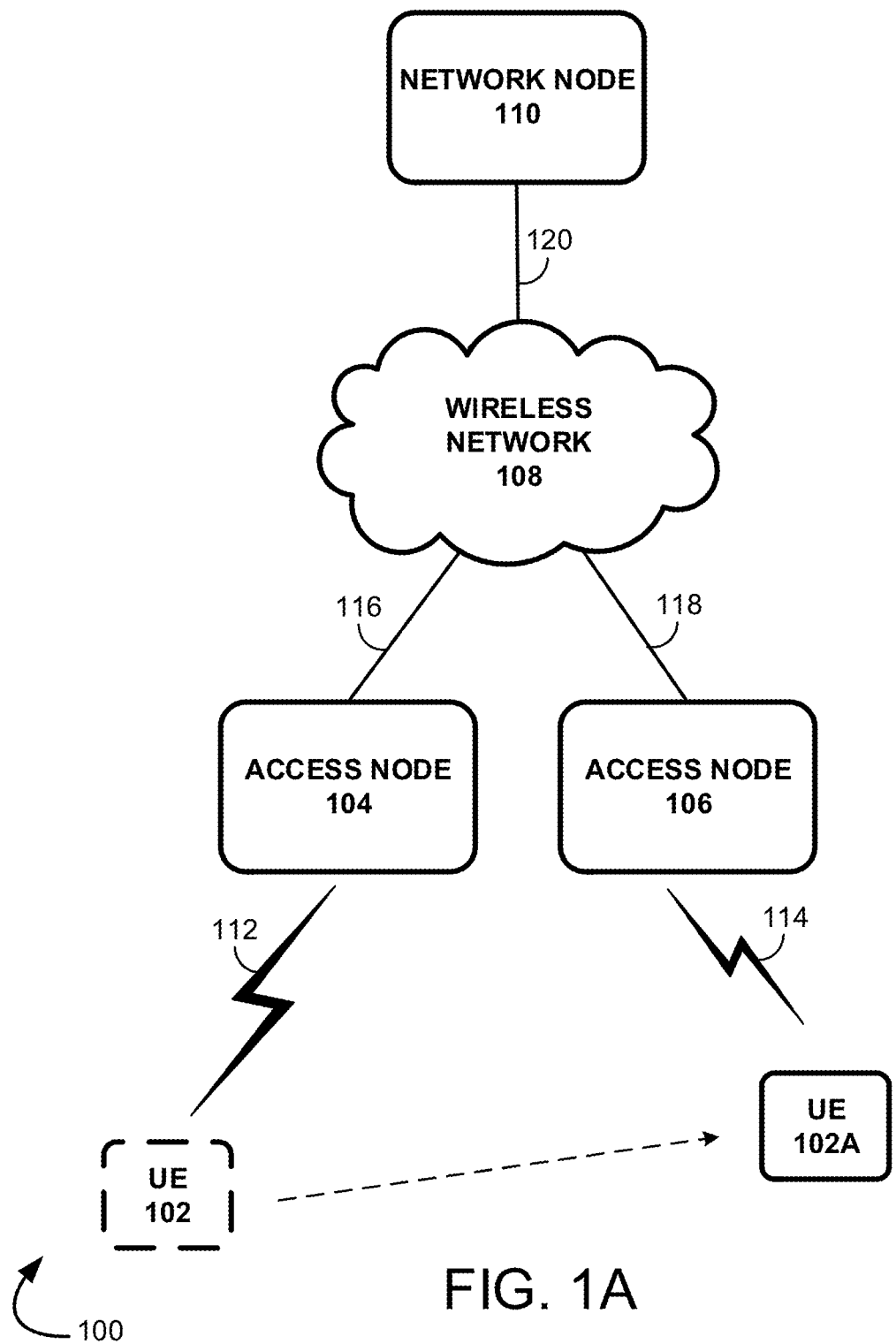
FIG. 1A illustrates an exemplary communication system for prioritizing ANs and/or cell sectors for handover of a beam-formed (or candidate) wireless device in a wireless network.

As wireless networks develop, spatial filtering creates opportunities to combat multipath fading and/or to mitigate co-channel interference at wireless devices. Referring to FIG. 1A, in operation, smart antenna arrays (e.g., switched-beam, phased array, and/or adaptive array systems) are configured at ANs 104, 106 to exploit a diversity effect at ANs 104, 106 (i.e., Tx/Rx of multiple radio frequencies at Tx/Rx antennas 122, illustrated in FIG. 1B, of the smart antenna arrays configured at ANs 104, 106 to decrease error and increase data speed between ANs 104, 106 and wireless devices 102, 102A) to boost signal-capturing power at and/or improve long-range communications for wireless devices 102, 102A (or select geographic areas) operating within a radio range (i.e., minimum usable signal area) of ANs 104, 106 on the downlink (DL), while suppressing and/or nullifying signals emanating to/from other wireless devices and/or ANs.

For example, wireless network 108 (or network node 110) may equip the smart antenna arrays (as opposed to omnidirectional and/or sectorized antenna arrays) deployed at ANs 104, 106 with intelligent beam-steering (i.e., with signal processing algorithms which can easily locate and track wireless devices 102, 102A) such that ANs 104, 106 can radiate beams and/or beam patterns toward select wireless devices 102, 102A operating within a radio range of the ANs 104, 106 on the DL (i.e., intelligent choice), while suppressing and/or nullifying signals emanating to/from other wireless devices and/or ANs.

In one embodiment, as wireless device 102 moves along a path within a radio range of AN 104, AN 104 may instruct the wireless device 102 to measure and/or report various detectable signal properties (e.g., Channel Quality Indicators (CQI), Received Signal Strength Indicators (RSSI), Reference Signal Received Power (RSRP), Reference Signal Received Quality (RSRQ), Signal-to-Interference-Plus-Noise Ratio (SINR), etc.), Cell-IDs, etc., broadcasted by ANs 104, 106 positioned at varying geographic locations within wireless network 108 on the uplink (UL) at AN 104. Wireless device 102 may also report an availability of uplink air-interface Sounding Reference Signal (SRS) resources (e.g., SRS resource blocks allocatable to wireless device 102) on the UL at AN 104. AN 104 collects the reported signal properties, Cell-IDs, and/or SRS' at Tx/Rx antennas 122 of the smart antenna array (i.e., collected information) and uses the collected information to estimate (or determine) a Direction of Arrival (DoA) for signals emanating from wireless device 102 using various techniques such as Multiple Signal Classification (MUSIC) and/or through estimation of signal parameters via rotational invariance techniques (ESPRIT), etc. The DoA of the signals (or similarly the Angle of Arrival) are used by AN 104 to calculate beamforming weights; AN 104's smart antenna array uses the calculated beamforming weights to radiate beams and/or beam patterns (e.g., formed by aligning beam main-lobes to the DoA at beam-select 124 and/or beam-former 126) on the DL toward wireless device 102 (e.g., by weighting the magnitude and phase of individual antenna signals broadcast by Tx/Rx antennas 122 of AN 104's antenna array at beam-select 124 and/or beam-former 126). AN 104 may continuously control and/or radiate (i.e., direct) beams and/or beam patterns toward wireless device 102 as wireless device 102 moves along a path within the radio range of AN 104 (i.e., according to the movement of wireless device 102) to increase signal-capturing power at and/or improve long-range communications for wireless device 102. AN 104 can use the Tx/Rx antennas 122 of the smart antenna array to suppress and/or nullify various signals emanating to/from other wireless devices and/or ANs by applying, for example, a beam pattern null from the smart antenna array in the direction of the interfering signals.

Because ANs 104, 106 support a restricted number of "beam-formed" wireless devices (e.g., as a function of SRS period(s)), AN 104 may choose to "handoff" beam-formed (or candidate) wireless devices 102 to a target AN 106 and/or cell sector of a target AN 106 based on an open beamforming seat. For example, in an exemplary embodiment, AN 104 may use reported signal properties (e.g., CQI, RSSI, RSRP, RSRQ, SINR, etc.), Cell-IDs, etc., associated with target ANs 106 and/or cell sectors of the target ANs 106 collected (or measured) at wireless device 102 and/or SRS' to estimate (or determine) a DoA for signals emanating from wireless device 102 at AN 104. AN 104 may use the reported signal properties (e.g., CQI, RSSI, RSRP, RSRQ, SINR, etc.), Cell-IDs, etc., of the target ANs 106 and/or cell sectors of the target ANs 106 to determine a pool of candidate ANs 106 and/or cell sectors of candidate ANs 106 for handover of wireless device 102. From the pool of candidate ANs 106 and/or cell sectors of candidate ANs 106, which may be non-beam-form capable, AN 104 selects only beam-form capable candidate ANs 106 and/or cell sectors of the beam-form capable candidate ANs 106. The selected beam-form capable candidate ANs 106 and/or cell sectors of the beam-form capable candidate ANs 106 may be prioritized (i.e., over other beam-form capable ANs and/or cell sectors) at AN 104 for handover of wireless device 102 based on an open beamforming seat. AN 104 may perform a handover of wireless device 102 to the prioritized beam-form capable candidate AN 106 and/or cell sector of the beam-form capable candidate AN 106.

Figure 1B:
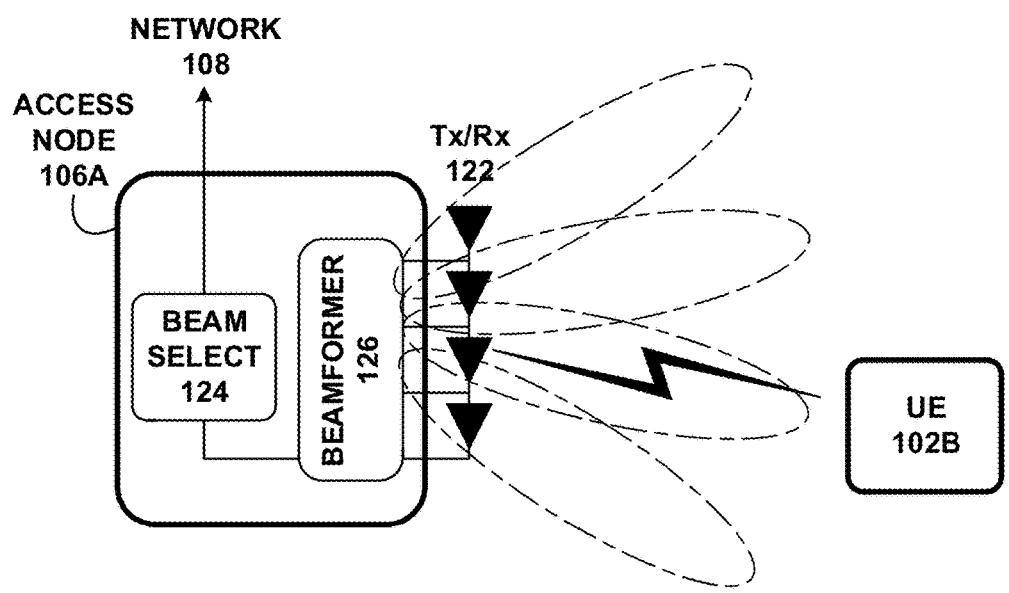
FIG. 1B illustrates an exemplary AN equipped with a smart antenna array.

FIG. 1A illustrates an exemplary communication system 100 for prioritizing ANs and/or cell sectors for handover of a beam-formed (or candidate) wireless device in a wireless network. FIG. 1B illustrates an exemplary AN equipped with a smart antenna array. System 100 can comprise wireless devices 102, 102A, 102B, ANs 104, 106, 106A, wireless network 108, and network node 110. Other network elements may be present in the system 100 to facilitate communication but are omitted for clarity, such as controller nodes, base stations, base station controllers, gateways, Mobile-Switching Centers (MSC), Dispatch Application Processors (DAP), and location registers such a Home Location Register (HLR) or Visitor Location Register (VLR). Furthermore, other network elements may be present to facilitate communication between ANs 104, 106, 106A and wireless network 108, which are omitted for clarity, including additional processing nodes, routers, gateways, and physical and/or wireless data links for carrying data among the various network elements.

Wireless devices 102, 102A, 102B can be any device configured to communicate over system 100 using a wireless interface. For example, wireless devices 102, 102A, 102B can include a remote terminal unit, a cell phone, a smart phone, a computing platform such as a laptop, palmtop, or a tablet, a Personal Digital Assistant (PDA), or an internet access device, and combinations thereof. It is noted that while two wireless devices 102, 102A are illustrated in FIG. 1A and one wireless device 102B is illustrated in FIG. 1B as being in communication with ANs 104, 106 and/or 106A, any number of wireless devices can be implemented according to various exemplary embodiments disclosed herein.

Wireless devices 102, 102A, 102B can transmit and/or receive information over system 100 using various communication services. These services can include various voice, data, and/or Multimedia Broadcast Multicast Service (MBMS) services and applications. For example, mobile voice services, mobile data services, Push-to-Talk (PTT) services, internet services, web-browsing, email, pictures, picture messaging, video, video messaging, broadcast video, audio, voicemail, music MP3's, ring tones, stock tickers, news alerts, etc.

ANs 104, 106, 106A can be any network node configured to provide communication between wireless devices 102, 102A, 102B and wireless network 108. ANs 104, 106, 106A can be short-range ANs or standard ANs. A short-range AN could include a microcell base station, a picocell base station, a femtocell base station, or the like; a standard AN could include a base transceiver station, a radio base station, an eNodeB device, or an enhanced eNodeB device, or the like. Smart antenna arrays (e.g., switched-beam, phased array, and/or adaptive array systems) with intelligent beam-steering may be deployed at and/or exploited at ANs 104, 106, 106A. For example, ANs 104, 106, 106A may use Tx/Rx antennas 122 of the smart antenna arrays to direct beams and/or beam patterns toward select wireless devices 102, 102A, 102B (or geographic areas) within a coverage area (i.e., minimum usable signal area) of ANs 104, 106, 106A to increase signal-capturing power at the wireless devices 102, 102A, 102B (or geographic areas), while suppressing and/or nullifying signals emanating to/from other wireless devices and/or ANs. ANs 104, 106, and/or 106B may use a beam-select node 124 and/or beam-former node 122 to, for example, calculate beamforming weights, weight the magnitude and/or phase of individual antenna signals broadcast by Tx/Rx antennas 122, align beam main-lobes to DoA, etc. Beam-select node 124 and/or beam-former node 122 may be configured as an exemplary processing node 500, illustrated in FIG. 5. It is noted that while two ANs 104, 106 are illustrated in FIG. 1A and one AN 106A is illustrated in FIG. 1B, any number of ANs can be implemented within system 100.

Communication network 108 can be a wired and/or wireless communication network, and can comprise processing nodes, routers, gateways, and physical and/or wireless data links for carrying data among various network elements, including combinations thereof, and can include a Local Area Network (LAN), a Wide Area Network (WAN), and an internetwork (including the Internet). Communication network 108 can be capable of carrying data, for example, to support voice, PTT, broadcast video, and data communications by a wireless device, for example, wireless devices 102, 102A, 102B. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof Network node 110 can be any network node configured to communicate information and/or control information over system 100. For example, network node 110 can receive information from or transmit information to wireless devices 102, 102A, 102B over system 100. For ease of illustration, network node 110 is shown to be located within the backhaul of system 100. However, network node 110 could alternatively be between ANs 104, 106, 106A and wireless network 108. Network node 110 can be a standalone computing device, computing system, or network component, and can be accessible, for example, by a wired or wireless connection, or through an indirect connection such as through a computer network or wireless network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 110 is not limited to any specific technology architecture, such as LTE, and can be used with any network architecture and/or protocol.

Communication links 112, 114, 116, 118, 120 can be wired or wireless and use various communication protocols such as Internet, Internet Protocol (IP), LAN, optical networking, Hybrid Fiber Coax (HFC), telephony, T1, or some other communication format—including combinations, improvements, or variations thereof. Wireless communication links can be a Radio Frequency (RF), microwave, infrared, or other similar signal, and can use a suitable communication protocol, for example, GSM, CDMA, WiMAX, or LTE, or combinations thereof. Other wireless protocols can also be used. Links 112, 114, 116, 118, 120 can be direct link or might include various equipment, intermediate components, systems, and networks.

Figure 2:
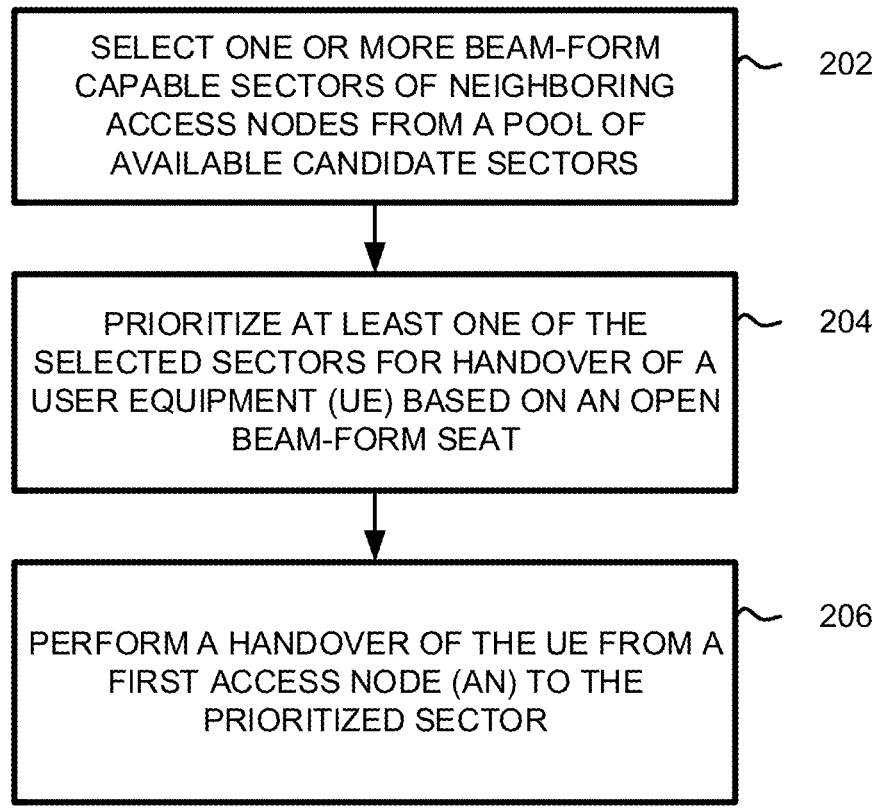
FIG. 2 illustrates a flow chart of an exemplary method for prioritizing ANs and/or cell sectors for handover of a beam-formed (or candidate) wireless device in a wireless network.

FIG. 2 illustrates a flow chart of an exemplary method for prioritizing ANs and/or cell sectors for handover of a beam-formed (or candidate) wireless device in a wireless network. The method will be discussed with reference to the exemplary system 100 illustrated in FIG. 1A and the exemplary AN illustrated in FIG. 1B. However, the method for prioritizing ANs and/or cell sectors for handover of a beam-formed (or candidate) wireless device illustrated in FIG. 2 can be implemented with any suitable communication system. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 2, multiple beam-form enabled Tx/Rx antennas 122 may be deployed at ANs 104, 106, 106A of wireless network 108 and may be configured to control a direction of a wavefront (i.e., of RF signals) by appropriately weighting the magnitude and phase of individual antenna signals (i.e., transmitted from Tx/Rx antennas 122). For example, AN 104, 106, 106A may use individual Tx/Rx antennas 122 of the smart antenna array (e.g., switched-beam, phased array, and/or adaptive array systems) deployed at AN 104, 106, 106A, equipped with intelligent beam-steering, to continuously control and/or radiate (i.e., direct) beams and/or beam patterns toward select wireless devices 102, 102A, 102B using the individual Tx/Rx antennas 122 in the smart antenna array to contribute to a steered RF signal and/or wavefront. AN 104, 106, 106A use the beams and/or beam patterns (i.e., the steered RF signals and/or wavefront) to achieve beamforming gains at the selected wireless devices 102, 102A, 102B as the wireless devices 102, 102A, 102B move within a radio range of AN 104, 106, 106A. AN 104, 106, 106A can use the beam-form enabled Tx/Rx antennas 122 of the smart antenna array to suppress interfering signal(s) emanating to/from other wireless devices and/or ANs by applying a beam pattern null from the beam-form enabled Tx/Rx antennas 122 in the direction(s) of the interfering signal(s). AN 104, 106, 106A may choose to "handoff" beam-formed (or candidate) wireless devices 102, 102B to a beam-form capable target AN 104, 106, 106A and/or cell sectors of the beam-form capable target AN 104, 106, 106A, when a beam-form load (e.g., a number of beam-formed wireless devices) at a source AN 104, 106, 106A meets (or exceeds) a threshold.

For example, at 202, wireless network 108 may select one or more beam-form capable, neighboring ANs 106, 106A and/or cell sectors of the beam-form capable, neighboring ANs 106, 106A from a pool of available candidate ANs 106, 106A and/or cell sectors. Source AN 104 may instruct one or more wireless devices 102, 102B operating at an edge of a radio range (i.e., minimum usable signal area) of AN 104 to measure and/or report various detectable signal properties (e.g., CQI, RSSI, RSRP, RSRQ, SINR, etc.), Cell-IDs, etc., broadcast by ANs 106, 106A from the pool of candidate ANs 106, 106A on the UL at AN 104. The one or more wireless devices 102, 102B may also report an availability of UL air-interface SRS resources (e.g., SRS resource blocks allocatable to wireless devices 102, 102B) on the UL at AN 104. From the reported signal properties, Cell-IDs, etc., associated with the pool of candidate ANs 106, 106A, AN 104 (e.g., via beam-select 124 and/or beam-former 126) may select beam-form capable ANs 106 and/or cell sectors of the beam-form capable ANs 106 from the pool of candidate ANs 106, 106A and/or cell sectors of the pool of candidate ANs 106, 106A (e.g., neighboring ANs and/or cell sectors of neighboring ANs whose reported signal properties, Cell-IDs (e.g., CSG-ID, etc.), meet a requirement at the wireless device 102, 102B).

At 204, source AN 104 prioritizes the selected beam-form capable ANs 106 and/or cell sectors of the beam-form capable ANs 106 for handover of the wireless device(s) 102, 102B based on an open beamforming seat. For example, source AN 104 (via wireless network 108 and/or network node 110) may determine (or calculate) a beam-form load (e.g., a number of beam-formed wireless devices) at cell sectors of the selected beam-form capable ANs 106. If the beam-form load at one or more cell sectors of the selected beam-form capable AN 106 and/or a total beam-form load for the selected beam-form capable AN 106 meets (or exceeds) a threshold (i.e., a restricted number of beam-form seats), the cell sector of the beam-form capable AN 106 and/or the beam-form capable AN 106 is de-prioritized for handover of the wireless devices 102, 102B. In other words, source AN 104 prioritizes cell sectors of the beam-form capable ANs 106 and/or beam-form capable ANs 106 selected from the pool of candidate ANs 106, 106A based on an open beam-form seat at at least one cell sector of the beam-form capable AN 106 and/or at the beam-form capable AN 106 (i.e., an overall beam-form load at AN 106 has not met or exceeded a restricted number of beam-form seats).

At 206, source AN 104 may perform a handover of the wireless devices 102, 102B to prioritized cell sectors of the beam-form capable ANs 106 with an open beam-form seat. For example, AN 104 can "handoff" beam-formed (or candidate) wireless devices 102, 102B (e.g., wireless device 102A) to prioritized cell sectors of beam-form capable AN 106. AN 106 may instruct wireless device 102A to report an availability of UL air-interface SRS resources (e.g., SRS resource blocks allocatable to wireless device 102A) on the UL at Tx/Rx antennas 122 of AN 106. AN 106 may use the reported SRS' to estimate (or determine) a DoA for wavefronts (or RF signals) emanating from wireless device 102A using various techniques such as MUSIC and/or through estimation of signal parameters via ESPRIT, etc. Based on the DoA of the wavefronts (or RF signals), AN 106 calculates beamforming weights; AN 106's Tx/Rx antennas 122 (i.e., of the smart antenna array) use the calculated beamforming weights to radiate beams and/or beam patterns (e.g., formed by aligning beam main-lobes to the DoA) on the DL toward wireless device 102A (e.g., by weighting the magnitude and phase of individual antenna signals broadcast by Tx/Rx antennas 122 of AN's 106 antenna array). As wireless device 102A moves within a radio range of AN 106, AN 106 via Tx/Rx antennas 122 may continuously control and/or radiate (i.e., direct) beams and/or beam patterns toward the wireless device 102A using the individual Tx/Rx antennas 122 in the smart antenna array to contribute to a steered RF signal and/or wavefront. AN 106 uses the beams and/or beam patterns (i.e., the steered RF signals and/or wavefront) to achieve beamforming gains at wireless device 102A, while applying a beam pattern null from the Tx/Rx antennas 122 in the direction of other wireless devices and/or ANs to suppress interfering signal(s) emanating to/from other wireless devices and/or ANs.

Figure 3:
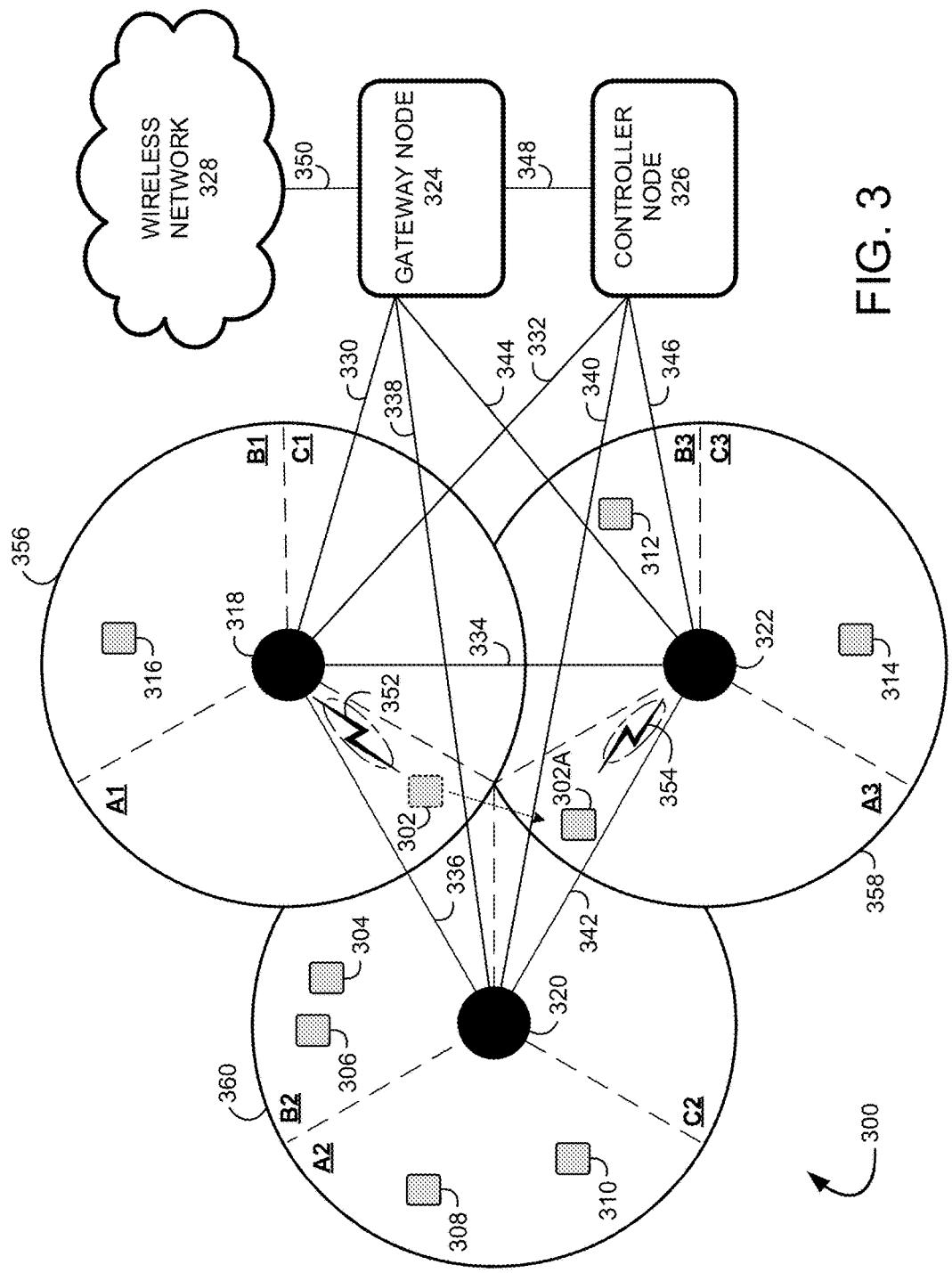
FIG. 3 illustrates another exemplary communication system for prioritizing ANs and/or cell sectors for handover of a beam-formed (or candidate) wireless device in a wireless network.

FIG. 3 illustrates another exemplary communication system 300 for prioritizing ANs and/or cell sectors for handover of a beam-formed (or candidate) wireless device in a wireless network. System 300 can comprise wireless devices 302, 302A, 304, 306, 308, 310, 312, 314, 316, ANs 318, 320, 322, gateway node 324, controller node 326, and wireless network 328. Other network elements may be present in the communication system 300 to facilitate communication but are omitted for clarity, such as base stations, base station controllers, gateways, MSCs, DPAs, and location registers such as a HLR or VLR. Furthermore, other network elements may be present to facilitate communication, such as between ANs 318, 320, 322 and wireless network 328, which are omitted for clarity, including additional processing nodes, routers, gateways, and physical and/or wireless data links for carrying data among the various network elements.

Wireless devices 302, 302A, 304, 306, 308, 310, 312, 314, 316 can be any device configured to communicate over system 300 using a wireless interface. For example, wireless devices 302, 302A, 304, 306, 308, 310, 312, 314, 316 can include a remote terminal unit, a cell phone, a smart phone, a computing platform such as a laptop, palmtop, or a tablet, a PDA, or an internet access device, and combinations thereof. Wireless devices 302, 302A, 304, 306, 308, 310, 312, 314, 316 can include one or more Tx/Rx antennas (not shown) for transmitting and receiving data over system 300. Each Tx/Rx antenna can be associated with the same or different frequency bands, the same or different radio access technologies, the same or different network providers, and/or the same or different services. For example, wireless devices 302, 302A, 304, 306, 308, 310, 312, 314, 316 can include Tx/Rx antennas that are associated with one or more of the following: CDMA, GSM, WiMAX, LTE, HSDPA, IEEE 802.11, WiFi, Bluetooth, Zigbee, IrDA, MBMS, etc.

Wireless devices 302, 302A, 304, 306, 308, 310, 312, 314, 316 can be connected with ANs 318, 320, 322 through communication links (illustrated only between AN 318 and wireless device 302 and AN 322 and wireless device 302A). For example, the links 352, 354 can use various communication media, such as air, space, metal, optical fiber, or some other signal propagation path - including combinations thereof. The links 352, 354 may comprise many different signals sharing the same link. The links 352, 354 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 302A, 304, 306, 308, 310, 312, 314, 316 and ANs 318, 320, 322 could share the same representative wireless link, but be transferred over different communication sessions, frequencies, timeslots, packets, ports, sockets, logical transport links, or in different directions - including combinations thereof Wireless devices 302, 302A, 304, 306, 308, 310, 312, 314, 316 can transmit and/or receive information over system 300 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

ANs 318, 320, 322 can be any network node configured to provide communication between wireless devices 302, 302A, 304, 306, 308, 310, 312, 314, 316 and wireless network 328. ANs 318, 320, 322 can be short-range ANs or standard ANs. A short-range AN could include a microcell base station, a picocell base station, a femtocell base station, or the like; a standard AN could include a base transceiver station, a radio base station, an eNodeB device, or an enhanced eNodeB device, or the like. In an exemplary embodiment, a picocell AN can have a coverage area of approximately a half a kilometer and an output power of less than one watt; a macrocell AN can have a coverage area in the range of approximately five kilometers to thirty-five kilometers and an output power in the tens of watts. In yet another exemplary embodiment, a femtocell AN can have a coverage area in the range of fifty to two-hundred meters and an output power in the range of 0.5 to 1 watts. Femtocell AN can be cellular AN or WiFi AN. In addition, a wireless device configured to enter a hotspot mode can be a femtocell AN. ANs 318, 320, 322 may divided into multiple cell sectors A1, B1, C1, A2, B2, C2, A3, B3, C3. While ANs 318, 320, 322 are illustrated in FIG. 3 as being divided into three cell sectors A1, B1, C1, A2, B2, C2, A3, B3, C3, ANs 318, 320, 322 may be divided into any number of cell sectors. Smart antenna arrays (e.g., switched-beam, phased array, and/or adaptive array systems) with intelligent beam-steering may be deployed at and/or exploited at ANs 318, 320, 322. For example, ANs 318, 320, 322 may use Tx/Rx antennas (illustrated in FIG. 1B) of the smart antenna arrays to direct beams and/or beam patterns toward select wireless devices 302, 302A, 304, 306, 308, 310, 312, 314, 316 (or geographic areas) within a radio range (i.e., minimum usable signal area) 356, 358, 360 of ANs 318, 320, 322 to increase signal-capturing power at the wireless devices 302, 302A, 304, 306, 308, 310, 312, 314, 316 (or within the geographic areas), while suppressing and/or nullifying signals emanating to/from other wireless devices and/or ANs. ANs 318, 320, 322 may use a beam-select node (illustrated in FIG. 1B) and/or beam-former node (illustrated in FIG. 1B) to, for example, calculate beamforming weights, weight the magnitude and/or phase of individual antenna signals broadcast by Tx/Rx antennas (of a smart antenna array), align beam main-lobes to DoA, etc. The beam-select node and/or beam-former node may be configured as an exemplary processing node 500 (illustrated in FIG. 5). It is noted that while three ANs 318, 320, 322 are illustrated in FIG. 3, any number of ANs can be implemented within system 300.

ANs 318, 320, 322 can comprise a processor and associated circuitry to execute or direct the execution of computer-readable instructions to obtain information. ANs 318, 320, 322 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 318, 320, 322 can receive instructions and other input at a user interface.

Gateway node 324 can be any network node configured to interface with other network nodes using various protocols. Gateway node 324 can communicate user data over system 300. Gateway node 324 can be a standalone computing device, computing system, or network component, and can be accessible, for example, by a wired or wireless connection, or through an indirect connection such as through a computer network or cellular network. For example, gateway node 324 can include a Serving Gateway (SGW) and/or a Public Data Network Gateway (PGW), etc. One of ordinary skill in the art would recognize that gateway node 324 is not limited to any specific technology architecture, such as LTE and can be used with any network architecture and/or protocol.

Gateway node 324 can comprise a processor and associated circuitry to execute or direct the execution of computer-readable instructions to obtain information. Gateway node 324 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 324 can receive instructions and other input at a user interface.

Controller node 326 can be any network node configured to communicate information and/or control information over system 300. Controller node 326 can be configured to transmit control information associated with a handover procedure. Controller node 326 can be a standalone computing device, computing system, or network component, and can be accessible, for example, by a wired or wireless connection, or through an indirect connection such as through a computer network or cellular network. For example, controller node 326 can include a MME, a HSS, a PCRF, an AAA node, a RMS, a SPS, a policy server, etc. One of ordinary skill in the art would recognize that controller node 326 is not limited to any specific technology architecture, such as LTE and can be used with any network architecture and/or protocol.

Controller node 326 can comprise a processor and associated circuitry to execute or direct the execution of computer-readable instructions to obtain information. Controller node 326 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 326 can receive instructions and other input at a user interface.

AN 318 may be connected with gateway node 324 through communication link 330 and with controller node 326 through communication link 332. AN 318 may be connected with ANs 320, 322 through communication links 334, 336. AN 320 may be connected with gateway node 324 through communication link 338 and with controller node 326 through communication link 340. AN 320 may be connected with AN 322 through communication link 342. AN 322 may be connected with gateway node 324 through communication link 344 and with controller node 326 through communication link 346. Gateway node 324 may be connected with controller node 326 through communication link 348 and with wireless network 328 through communication link 350. Links 330, 332, 334, 336, 338, 340, 342, 344, 346, 348, 350 can be wired or wireless and use various communication protocols such as Internet, IP, LAN, optical networking, HFC, telephony, T1, or some other communication format—including combinations, improvements, or variations thereof. Links 330, 332, 334, 336, 338, 340, 342, 344, 346, 348, 350 can be a RF, microwave, infrared, or other similar signal, and can use a suitable communication protocol, for example, GSM, CDMA, WiMAX, or LTE, or combinations thereof. Other wireless protocols can also be used. Links 330, 332, 334, 336, 338, 340, 342, 344, 346, 348, 350 can be a direct link or might include various equipment, intermediate components, systems, and networks.

Figure 4:
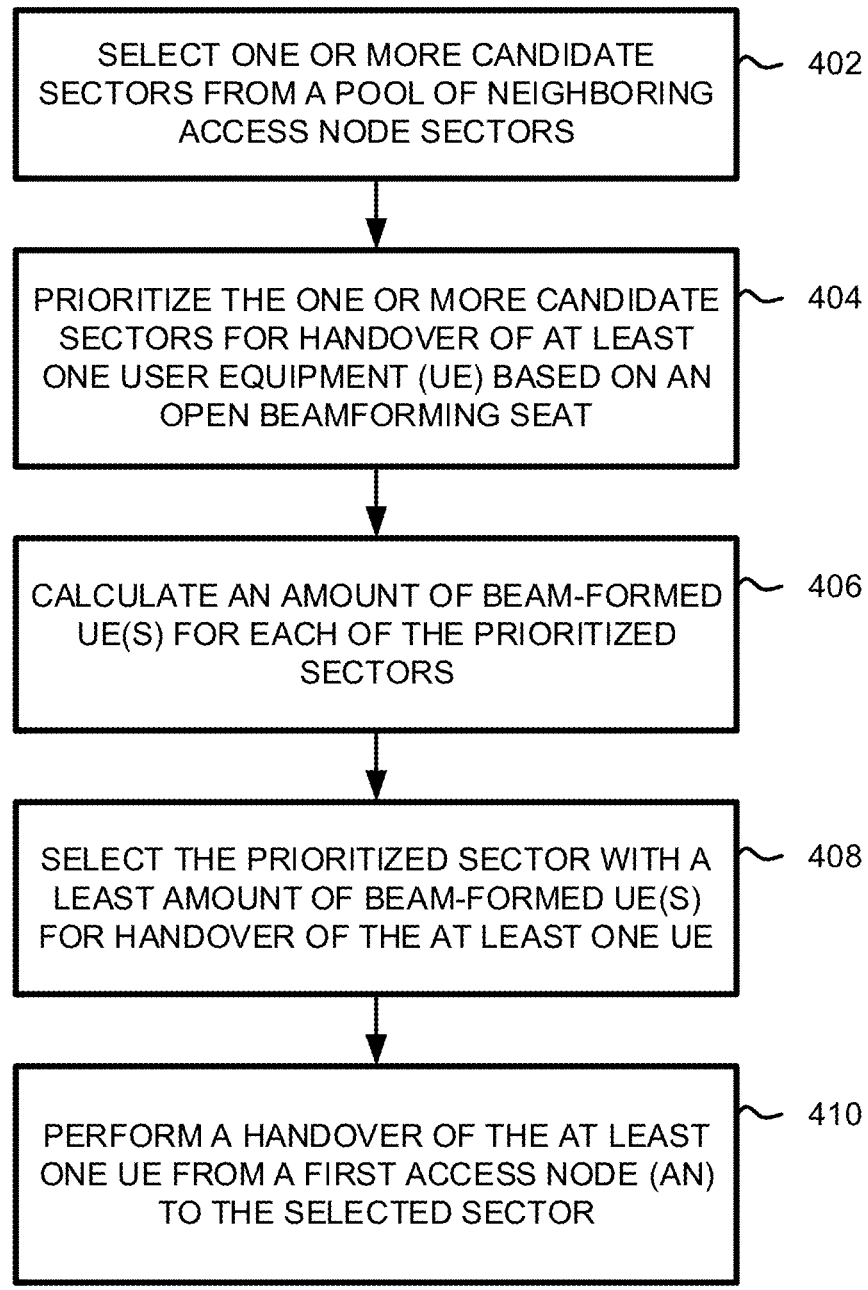
FIG. 4 illustrates another flow chart of an exemplary method for prioritizing ANs and/or cell sectors for handover of a beam-formed (or candidate) wireless device in a wireless network.

Wireless network 328 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 328 can be capable of carrying data, for example, to support voice, PTT, broadcast video, and data communications by a wireless device, such as wireless devices 302, 302A, 304, 306, 308, 310, 312, 314, 316. Wireless network protocols can comprise MBMS, CDMA ixRTT, GSM, UMTS, HSPA, EV-DO, EV-DO rev. A, 3GPP LTE, and WiMAX. Wired network protocols that may be utilized by wireless network 328 comprise Ethernet, Fast Ethernet, Gigabit Ethernet, Local Talk (such as Carrier Sense Multiple Access with Collision Avoidance), Token Ring, FDDI, ATM. Wireless network 328 can also comprise additional base stations, controller nodes, telephony switches, internet routers, network gateways, computer systems, communication links, or some other type of communication equipment, and combinations thereof FIG. 4 illustrates another flow chart of an exemplary method for prioritizing ANs and/or cell sectors for handover of a beam-formed (or candidate) wireless device in a wireless network. The method will be discussed with reference to the exemplary system 300 illustrated in FIG. 3. But, the method for prioritizing ANs and/or cell sectors for handover of a beam-formed (or candidate) wireless device in a wireless network illustrated in FIG. 4 can be implemented in the exemplary system 100 illustrated in FIGS. 1A and 1B, or with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 4, multiple beam-form enabled Tx/Rx antennas (illustrated in FIG. 1B) of a smart antenna array (e.g., switched-beam, phased array, and/or adaptive array systems) may be deployed at ANs 318, 322 of wireless network 328. The Tx/Rx antennas may be equipped with intelligent beam-steering and employ an algorithm for calculating optimum beamforming weights (e.g., based on DoA, AoA, and/or channel estimation of wavefronts and/or RF signals arriving from select wireless devices); For example, AN's 318, 322 Tx/Rx antennas (i.e., of the smart antenna array) use the calculated beamforming weights to control and/or radiate (i.e., to direct) beams and/or beam patterns (e.g., formed by aligning beam main-lobes to a DoA) on the DL toward wireless devices 302, 312, 314, and/or 316 (e.g., by weighting the magnitude and phase of individual antenna signals broadcast by Tx/Rx antennas of AN's 318, 322 smart antenna array). As wireless devices 302, 312, 314, and/or 316 move within a radio range 356, 358 of ANs 318, 322, AN's 318, 322 use the Tx/Rx antennas to continuously control and/or radiate (i.e., direct) beams and/or beam patterns toward the wireless devices 302, 312, 314, and/or 316 (i.e., steered RF signals and/or wavefronts) to achieve beamforming gains at wireless devices 302, 312, 314, and/or 316, while applying a beam pattern null from the Tx/Rx antennas in the direction of other wireless devices and/or ANs to suppress interfering signal(s) emanating to/from other wireless devices and/or ANs.

At 402, source AN 318 may select one or more candidate cell sectors A1, B1, C1, A2, B2, C2, A3, B3, C3 of an AN 318, 320, 322 from a pool of neighboring cell sectors A1, B1, C1, A2, B2, C2, A3, B3, C3 of ANs 318, 320, 322. For example, source AN 318 may experience a beam-form load at one or more cell sectors A1, B1, C1 and/or a total beam-form load at the AN 318 that meets (or exceeds) a threshold (i.e., a maximum number of beam-form wireless devices 302, 316 supported at AN 318 and/or at each of the one or more cell sectors A1, B1, C1 as a function of a SRS period and/or SRS resource blocks allocatable to connected wireless devices 302, 316, for example, for one OEM with an SRS period of 5 milliseconds the maximum number of beam-form wireless devices is 48). When the beam-form load meets (or exceeds) the threshold, wireless network 328 may trigger AN 318 to instruct one or more wireless devices 302 operating at an edge of a radio range 356 and/or cell sector A1, B1, C1 boundary of AN 318 to measure and/or report detectable signal properties (e.g., CQI, RSSI, RSRP, RSRQ, SINR, etc.), Cell-IDs, etc., broadcast by neighboring ANs 320, 322 and/or cell sectors B1, C1, B2, C2, A3, B3 of a current cell sector Al of the one or more wireless devices 302 (i.e., pool of candidate ANs and/or cell sectors). The one or more wireless devices 302 may also report an availability of UL air-interface SRS resources (e.g., SRS resource blocks allocatable to wireless device 302) on the UL at AN 318.

At 404-408, source AN 318 may prioritize the pool of candidate ANs 318, 320, 322 and/or cell sectors B1, C1, B2, C2, A3, B3 for handover of the one or more wireless devices 302 based on an open beamforming seat. For example, source AN 318 uses the reported signal properties, Cell-IDs, etc., associated with the pool of candidate ANs 318, 320, 322 and/or cell sectors B1, C1, B2, C2, A3, B3 to select beam-form capable ANs 318, 322 and/or cell sectors C1, A3, B3 from the pool of candidate ANs 318, 320, 322 and/or cell sectors B1, C1, B2, C2, A3, B3. For each of the beam-form capable ANs 318, 322 and/or cell sectors C1, A3, B3, source AN 318 may calculate (or determine) a beam-form load (i.e., whether or not the AN 318, 322 and/or cell sector C1, A3, B3 meets or exceeds a threshold number of beam-form wireless devices supported at AN 318, 322 and/or cell sectors C1, A3, B3 as a function of a SRS period). If the beam-form load at AN 318, 322 and/or cell sector C1, A3, B3 meets or exceeds the threshold, the AN 318 and/or cell sector C1 is de-prioritized for handover of the wireless device 302. In other words, source AN 318 prioritizes ANs 322 and/or cell sectors A3, B3 from the pool of candidate ANs 318, 320, 322 and/or cell sectors B1, C1, B2, C2, A3, B3 based on an open beam-form seat. In some instances, one or more ANs 322 and/or cell sectors A3, B3 may be prioritized for handover of the wireless device 302. For example, source AN 318 may determine that both cell sectors A3, B3 of AN 322 have at least one open beam-form seat. If the cell sectors A3, B3 of AN 322 both offer a similar RSRP or other signal quality indicator and/or have a similar overall loading or beam-form load, AN 318 may select the "most-open" (i.e., highest number of available beam-form seats) cell sector A3 of AN 322 for handover of wireless device 302.

At 410, source AN 318 may perform a handover of the one or more wireless devices 302 to the prioritized AN 322 and/or cell sector A3 that has at least one open beam-form seat and/or that is "most-open". For example, AN 318 can "handoff" beam-formed (or candidate) wireless device 302 (i.e., illustrated as wireless device 302A) to the prioritized beam-form capable AN 322 and/or cell sector A3. AN 322 may instruct wireless device 302A to report an availability of UL air-interface SRS resources (e.g., SRS resource blocks allocatable to wireless device 302A) on the UL at Tx/Rx antennas of AN 322. AN 322 may use the reported SRS' to estimate (or determine) a DoA for wavefronts (or RF signals) emanating from wireless device 302A using various techniques such as MUSIC and/or through estimation of signal parameters via ESPRIT, etc. The Tx/Rx antennas at AN 322 may be equipped with intelligent beam-steering and employ an algorithm for calculating optimum beamforming weights (e.g., based on DoA, AoA, and/or channel estimation of wavefronts and/or RF signals arriving from wireless device 302A); For example, AN 322's Tx/Rx antennas (i.e., of the smart antenna array) use the calculated beamforming weights to control and/or radiate (i.e., to direct) beams and/or beam patterns (e.g., formed by aligning beam main-lobes to a DoA) on the DL toward wireless device 302A (e.g., by weighting the magnitude and phase of individual antenna signals broadcast by Tx/Rx antennas of AN 322's smart antenna array). As wireless device 302A moves within a radio range 358 of AN 322, AN 322 uses the Tx/Rx antennas to continuously control and/or radiate (i.e., direct) beams and/or beam patterns toward the wireless device 302A (i.e., steered RF signals and/or wavefronts) to achieve beamforming gains at wireless device 302A, while applying a beam pattern null from the Tx/Rx antennas in the direction of other wireless devices and/or ANs to suppress interfering signal(s) emanating to/from other wireless devices and/or ANs.

Figure 5:
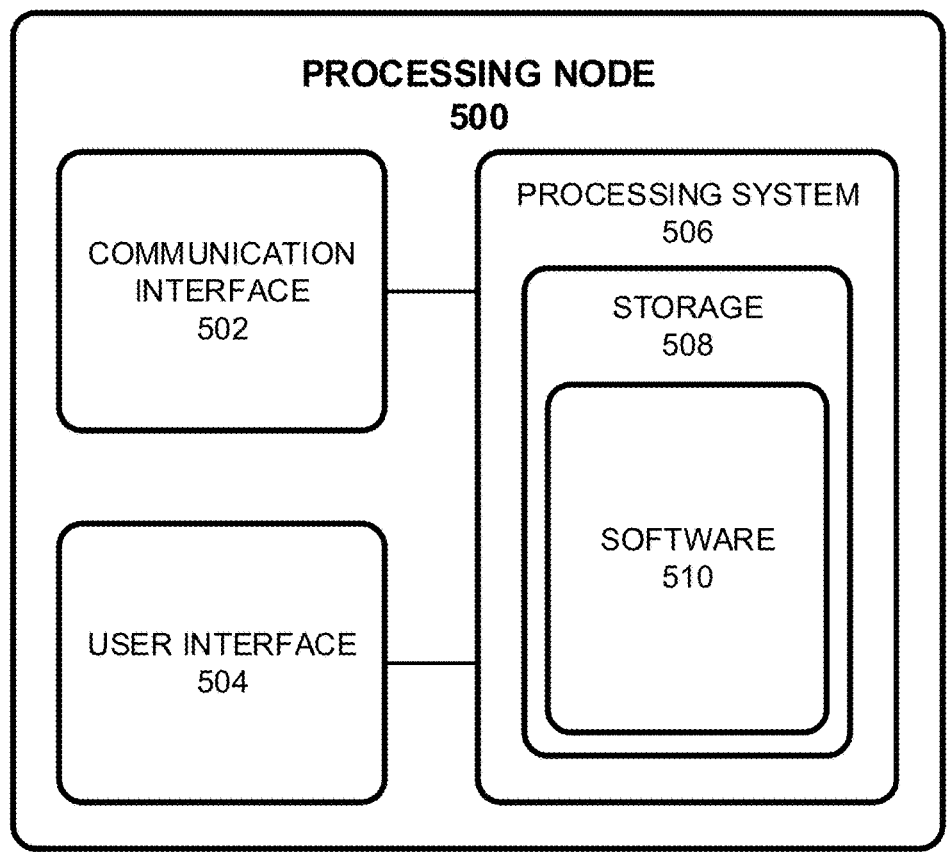
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication AN for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include ANs 104, 106, 106A, 318, 320, 322, beam-select node 124, beam-former node 126, network node 110, gateway node 324, and controller node 326. Processing node 500 can also be an adjunct or component of a network element, such as an element of ANs 104, 106, 106A, 318, 320, 322, beam-select node 124, beam-former node 126, network node 110, gateway node 324, and controller node 326. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for handover of at least one wireless device, the method comprising:
   verifying that one or more sectors offer beamforming;
   generating a list of prioritized sectors based on the verification, the sectors being prioritized based on an open beamforming seat;
   calculating a beam-form load for each of the sectors; and
   selecting the sector having a beam-form load meeting a set criteria for handover of the at least one wireless device.

2. The method of claim 1, wherein the set criteria is a sector having a greatest number of open beam-form seats as compared to other prioritized sectors.

3. The method of claim 1, wherein the prioritized sectors are within a radio range of the at least one wireless device.

4. The method of claim 1, wherein handover of the at least one wireless device is triggered at a first sector in response to the beam-form load meeting the set criteria.

5. The method of claim 4, wherein the criteria is a number of beam-form wireless devices supported at the first sector as a function of an Sounding Reference Signal (SRS) period.

6. The method of claim 4, wherein the selected the first sector instructs the at least one wireless device to report an availability of uplink (UL) air-interface Sounding Reference Signal (SRS) resources at the first sector.

7. The method of claim 4, further comprising:
   instructing the at least one wireless device to measure detectable signal properties of the one or more sectors, wherein the signal properties include at least one of a Channel Quality Indicator (CQI), Received Signal Strength Indicator (RS SI), and Signal-to-Interference-Plus-Noise Ratio (SINR).

8. A system for handover of at least one wireless device, the system comprising:
   a memory; and
   a processor configured to:
      verify that one or more sectors offer beamforming;
      generate a list of prioritized sectors based on the verification, the sectors being prioritized based on an open beamforming seat;
      calculate a beam-form load for each of the sectors; and
      select the sector having a beam-form load meeting a set criteria for handover of the at least one wireless device.

9. The system of claim 8, wherein the set criteria is a sector having a greatest number of open beam-form seats as compared to other prioritized sectors.

10. The system of claim 8, wherein the prioritized sectors are within a radio range of the at least one wireless device.

11. The system of claim 8, wherein handover of the at least one wireless device is triggered at a first sector in response to the beam-form load meeting the set criteria.

12. The system of claim 11, wherein the criteria is a number of beam-form wireless devices supported at the first sector as a function of an Sounding Reference Signal (SRS) period.

13. The system of claim 11, wherein the first sector is configured to instruct the at least one wireless device to report an availability of uplink (UL) air-interface Sounding Reference Signal (SRS) resources at the first sector.

14. The system of claim 11, where in the processor is further configured to:
   instruct the at least one wireless device to measure detectable signal properties of the one or more sectors, wherein the signal properties include at least one of a Channel Quality Indicator (CQI), Received Signal Strength Indicator (RS SI), and Signal-to-Interference-Plus-Noise Ratio (SINR).

15. A processing node for performing handover of at least one wireless device, the processing node comprising:
   a processor; and
   a memory storing instructions for the processor, the instructions comprising:
      verifying that one or more sectors offer beamforming;
      generating a list of prioritized sectors based on the verification, the sectors being prioritized based on an open beamforming seat;
      calculating a beam-form load for each of the sectors; and
      selecting the sector having a beam-form load meeting a set criteria for handover of the at least one wireless device.

16. The processing node of claim 15, wherein the set criteria is a sector having a greatest number of open beam-form seats as compared to other prioritized sectors.

17. The processing node of claim 15, wherein handover of the at least one wireless device is triggered at a first sector in response to the beam-form load meeting the set criteria.

18. The processing node of claim 17, wherein the criteria is a number of beam-form wireless devices supported at the first sector as a function of an Sounding Reference Signal (SRS) period.

19. The processing node of claim 17, wherein the first sector instructs the at least one wireless device to report an availability of uplink (UL) air-interface Sounding Reference Signal (SRS) resources at the first sector.

20. The processing node of claim 17, wherein the instructions further comprise:
   instructing the at least one wireless device to measure detectable signal properties of the one or more sectors, wherein the signal properties include at least one of a Channel Quality Indicator (CQI), Received Signal Strength Indicator (RS SI), and Signal-to-Interference-Plus-Noise Ratio (SINR).

* * * * *